United States Patent
Koolen et al.

(10) Patent No.: US 11,358,474 B2
(45) Date of Patent: Jun. 14, 2022

(54) CHARGING SYSTEM

(71) Applicant: ABB Schweiz AG, Baden (CH)

(72) Inventors: Gertjan Koolen, Eindhoven (NL); Jim Van-Der-Heijden, Eindhoven (NL)

(73) Assignee: ABB SCHWEIZ AG, Baden (CH)

( * ) Notice: Subject to any disclaimer, the term of this patent is extended or adjusted under 35 U.S.C. 154(b) by 164 days.

(21) Appl. No.: 16/558,877

(22) Filed: Sep. 3, 2019

(65) Prior Publication Data
US 2019/0389324 A1 Dec. 26, 2019

Related U.S. Application Data

(63) Continuation of application No. PCT/EP2018/055290, filed on Mar. 5, 2018.

(30) Foreign Application Priority Data

Mar. 3, 2017 (EP) .................................... 17159147

(51) Int. Cl.
*B60L 3/04* (2006.01)
*B60L 53/62* (2019.01)
(Continued)

(52) U.S. Cl.
CPC .............. *B60L 3/04* (2013.01); *B60L 53/16* (2019.02); *B60L 53/18* (2019.02); *B60L 53/30* (2019.02);
(Continued)

(58) Field of Classification Search
CPC .. B60L 3/04; B60L 53/62; B60L 53/16; B60L 53/18; B60L 53/30; B60L 2210/30; H02J 7/0045
(Continued)

(56) References Cited

U.S. PATENT DOCUMENTS 9,260,015 B2 * 2/2016 Gonzales .................. B60L 3/04
2011/0122536 A1 5/2011 Watanabe et al.
(Continued)

FOREIGN PATENT DOCUMENTS

EP 2325974 A2 5/2011
EP 2833498 A1 2/2015
(Continued)

OTHER PUBLICATIONS

European Patent Office, International Search Report & Written Opinion issued in corresponding Application No. PCT/EP2018/055290, dated May 11, 2018, 12 pp.
(Continued)

*Primary Examiner* — Suresh Memula (74) *Attorney, Agent, or Firm* — Greenberg Traurig, LLP (57) ABSTRACT

The invention relates to an electrical vehicle charging system, including a power source configured for providing electrical energy to charge an electrical vehicle, an outlet port configured for connecting the electrical vehicle to the charging system and for providing a DC voltage to the electrical vehicle, a switch configured for connecting the outlet port and the power source, and a control device configured, if the electrical vehicle is unconnected to the outlet port, for measuring the DC voltage at the outlet port, and configured, if the measured DC voltage is greater than zero, for switching off the DC voltage.

20 Claims, 3 Drawing Sheets

(51) Int. Cl.
  *B60L 53/16* (2019.01)
  *B60L 53/18* (2019.01)
  *H02J 7/00* (2006.01)
  *B60L 53/30* (2019.01)

(52) U.S. Cl.
  CPC ............ *B60L 53/62* (2019.02); *H02J 7/0045* (2013.01); *B60L 2210/30* (2013.01)

(58) Field of Classification Search
  USPC ........................................................ 320/109
  See application file for complete search history.

(56) References Cited

U.S. PATENT DOCUMENTS

| | | | |
|---|---|---|---|
| 2012/0319648 A1 | 12/2012 | Ohtomo | |
| 2014/0097790 A1 | 4/2014 | Yeh | |
| 2015/0137755 A1* | 5/2015 | Sadano | ................. H02J 7/0031 320/109 |
| 2016/0272070 A1* | 9/2016 | Kojima | .................... B60L 53/11 |
| 2016/0297310 A1* | 10/2016 | Kojima | .................... B60L 53/16 |
| 2017/0089982 A1* | 3/2017 | Hwang | .............. G01R 31/3278 |
| 2017/0106765 A1* | 4/2017 | Kim | ....................... H02J 7/0047 |
| 2017/0136913 A1* | 5/2017 | Yang | ......................... B60L 58/14 |
| 2017/0182893 A1* | 6/2017 | Hayashizaki | ............ B60L 53/14 |
| 2020/0317076 A1* | 10/2020 | Wang | ......................... B60L 3/12 |
| 2021/0097785 A1* | 4/2021 | Zhang | ..................... B60L 58/10 |

FOREIGN PATENT DOCUMENTS

| | | |
|---|---|---|
| EP | 3070810 A1 | 9/2016 |
| WO | 2011145939 A2 | 11/2011 |

OTHER PUBLICATIONS

European Communication pursuant to Article 94(3) EPC, issued by the European Patent Office regarding corresponding patent application Serial No. 18708127.8; dated Oct. 21, 2021; 6 pages.

* cited by examiner

CHARGING SYSTEM

TECHNICAL FIELD

The invention relates to an electrical vehicle charging system comprising a power source configured for providing electrical energy to charge an electrical vehicle, an outlet port configured for connecting the electrical vehicle to the charging system and for providing a DC voltage to the electrical vehicle, and a switch configured for connecting the outlet port and the power source.

BACKGROUND ART

Electrical vehicle charging systems are known from prior art and usually comprise an outlet port for connecting an electrical vehicle for charging a battery of the electrical vehicle and a switch for switching on respectively off the outlet port. Often, the switch is provided as a contactor, which means, that a welding detection is required in order to determine whether the contactor is welded in such case resulting in an unsafe system.

EP 3 070 810 A1 describes a voltage-between-terminals measurement unit that measures voltage between the terminals of a charging connector connecting an external charger that charges a battery.

US 2011/122536 A1 describes a power feed control device comprising a relay and a voltage detection circuit for charging an electrical vehicle.

Prior art describes various possibilities for welding detection, for example providing an auxiliary contact, which is an expensive solution. Alternatively, a leakage current to protective earth, PE, can be measured, which is also a complex solution that depends very much on the environment. Measuring a coil inductance is another complex and less reliable solution. In sum, there is no cheap, reliable and continuous solution known from prior art to detect welded contactors, in order to fulfil safety requirements, for example in the US and Europe to detect whether a contactor has a welding fault.

SUMMARY OF INVENTION

It is therefore an object of the invention to provide an electrical vehicle charging system and a respective method for detecting welding in an electrical vehicle charging system.

The object of the invention is solved by the features of the independent claims. Preferred embodiments are described in the dependent claims.

Thus, the object is solved by an electrical vehicle charging system, comprising a power source configured for providing electrical energy to charge an electrical vehicle, an outlet port configured for connecting the electrical vehicle to the charging system and for providing a DC voltage to the electrical vehicle, a switch configured for connecting the outlet port and a power source, and a control device configured, if the electrical vehicle is unconnected to the outlet port, for measuring the DC voltage at the outlet port, and configured, if the measured DC voltage is greater zero, for switching off the DC voltage.

A key aspect of the invention is therefore not to perform a welding detection as known from prior art, for example by providing an auxiliary contact or measuring a coil inductance, but rather preventing a hazardous voltage exposed on touchable parts of the outlet port, thereby increasing personal safety and protection of the electrical vehicle and the charging system. Prior art electrical vehicle charging protocols respectively standards usually include some kind of switch welding detection at a beginning and/or an end of a charging session. Although this detection might ensure a safe situation after a charging session, there are still potential dangerous situations if the electrical vehicle charging system comprises multiple outlet ports.

While an outlet port currently charging an electrical vehicle is protected against touching a hazardous voltage, unused outlet ports, i.e. outlet ports which are not connected to an electrical vehicle may still have terminals or pins to which a hazarded voltage is applied. However, such unused terminal ports should be touch safe at any moment, also during a charging session at another outlet port. The invention provides a cheap, reliable and continuous solution ensuring that unused outlet ports are touch safe, even when touching a terminal or pins of the outlet port. In this way an advantageous so called passive outlet welding detection is provided. The term greater zero is preferably meant that there is voltage than is dangerous for a human. Preferably, the DC voltage is switched off if the measured DC voltage is greater than 25V, 50V, 60V or 100V.

The outlet port can be provided as a plug, as a socket-outlet, as a connector, as an inlet and/or a cable assembly for connecting the electrical vehicle. Preferably, the outlet port is provided according to IEC 62196 standard, in particular complying to SAEJ1772, VDE-AR-E2623-2-2, EV plug alliance proposal and/or JEVSG105-1993 standard. For example, the outlet port is configured for conducting a DC voltage of 400 Volt and a DC current of 32 A, 63 A or 150 A. Besides that the outlet port can be configured to conduct higher voltages and amperes for allowing fast charging, for example 1000 V DC at 400 A or 150 kW, 300 kW or higher.

The control device is preferably provided as a voltmeter, sensing resistor or the like for measuring the DC voltage at the outlet port. The DC voltage is preferably measured directly at the outlet port. In a further alternative embodiment the control device can be configured to constantly measure the DC voltage at the outlet port, i.e. when an electrical vehicle is connected for example with a plug of its connecting cable plugged into the outlet port in this case provided as a socket. The control device may comprise a computerized control system such as a programmable logic controller. The term unconnected means, in case of a plug and the outlet port provided as a socket, that the plug is not inserted into the socket, i.e. that there is no electrical connection established between the electrical vehicle and the electrical vehicle charging system. The term unconnected can be further understood that terminals, pins or the like of the outlet port conducting the DC voltage can be touched by a human.

In a further embodiment the control device is configured for measuring the DC voltage at the outlet port only if the electrical vehicle is unconnected to the outlet port. The control device may comprise a means for checking the connection status of the outlet port, for example configured for checking if a plug associated to the electrical vehicle is plugged into the outlet port. In this way it can be reliably verified if the electrical vehicle is connected or unconnected to the outlet port.

According to another preferred embodiment the outlet port comprises a first line having first potential, a second line having a second potential and a protective earth line connected to protective earth, the second potential being lower than the first potential, and the control device is configured for measuring the DC voltage between the first line and the protective earth, between the second line and the protective earth, and/or between the first line and the second line. The first line, the second line and/or the protective earth line are preferably provided as a terminal or as a pin for electrically connecting with the respective terminal or pin of a connector associated to the electrical vehicle. The control device is preferably configured for switching off the DC voltage if the measured DC voltage between the first line and the protective earth line, the second line and the protective earth line or the first line and the second line is greater zero. Thus, not necessary a welding of the switch is detected but a DC voltage that might indicate said welding respectively function of the switch. Equally, the proposed solution may also detect arcs in an "almost" welded switch. The term protective earth, appreciated as PE, is to be understood as an equipment grounding conductor respectively as an earth connection supplied by a grid connected to the power source and can be combined with a neutral conductor.

Switching off the DC voltage if the measured DC voltage is greater zero can be done in varies ways. According to an especially preferred embodiment the control device is configured, if the measured DC voltage is greater zero, for disconnecting the switch from the power source and/or for shutting down the power source. Shutting down the power source can be done, for example, by disconnecting the power source from an AC grid providing electrical power to the power source. If the DC voltage is measured between the first line and the protective earth, between the second line and the protective earth, and/or between the first line and the second line as described before, then the switch is disconnected from the power source and/or the power source is shut down if any of the measured voltages is greater zero, or, according to the preferred embodiment described before, greater than 25V, 50V, 60V or 100V.

According to another preferred embodiment the control device is configured, if the measured DC voltage is greater zero, for switching off the DC voltage after a predetermined time period has elapsed. In this regard it is further preferred that the predetermined time period is ≥600 msec and ≤2.5 sec. In an alternative embodiment the predetermined time period is ≥300 msec and ≤1.5 or 3 sec. In such way a timing delay is implemented before switching off the DC voltage, which is advantageous when slowly plugging a connector into the outlet port. For example, with the IEEC 62196 standard, due to the design a signal pin of the connector associated to the electrical car is connected shortly after the DC pins have established electrical contact with the outlet port. Equally, when disconnecting the connector associated to the electrical car from the outlet port, the electrical connection of the signal pin is interrupted before the electrical connection of the DC pins is disconnected. With such predetermined time period an arc can be avoided when disconnecting the connector from the outlet port. During start-up of a charging session, DC voltage is often ramped-up to its target value but holds for a moment, for example 200 ms, on a safe voltage level before proceeding. Preferably during this time, the control device measures the DC voltage and switches it off in case required.

In this regard it is further preferred that the outlet port comprises a signal line, the control device is connected to the signal line and configured for receiving the predetermined time period from the signal line. Preferably, the signal line is provided as a signal pin with a function preferably defined in IEC 62196 or SAEJ1772-2001. More preferably, the signal line comprises a control pilot, CP, signal. Additionally, a pin can be provided for a proximity pilot, PP, signal, whereby normal charging power pins comprise before mentioned line pin for the first line, neutral pin for the second line and protective earth pin for the protective earth line.

According to another preferred embodiment the control device is configured for switching off the switch and is configured for measuring if thereupon the DC voltage at the outlet port decreases. Preferably before charging the electrical vehicle switch welding respectively contactor welding is checked for guarantee that no problems exist, for example due to unplugging the connector, due to a ground fault and/or due to an isolation fault. In such case energy flow between the power source and the outlet port respectively electrical vehicle should be interrupted.

Most DC charging protocols have a so-called "cable check phase", in which a high test voltage is put onto the electrical connection between the power source and the outlet port. According to said protocols, at the end of the cable check phase the charging system should discharge the electrical connection. Instead of the actively discharging the switch is switched off, which under normal conditions leads to a voltage decrease at the outlet port respectively at an electrical vehicle side of the switch. A decay thereby depends on a V-capacitance of the charging system and the electrical vehicle as well as on the control device measuring the DC voltage at the outlet port, for example comprising a sensing resistor measuring a DC voltage, thereby providing a vehicle discharge, which is crucial for this embodiment. If the switch is welded, the DC voltage will not decrease since the switch is connected, through the welding, to the power source still providing the DC voltage.

According to a further embodiment it is in this regard preferred that the control device is configured for determining if the DC voltage has decreased 500 msec after switching off the switch by more than 10 V. In case of affirmation the switch is not welded respectively otherwise the switch is welded. After said time period of 500 msec the electrical connection between the power source and the outlet port is preferably discharged and the charging session continuous if there is no welding detected. Alternatively, the control device may be configured for determining if the DC voltage has decreased 250 msec, 1 s or 2 s after switching off the switch by more than 5 Volt, 20 Volt or 50 Volt. In this way an advantageous so called active outlet welding detection is provided.

Generally, the switch can be provided by various means. According to an especially preferred embodiment the switch is provided as a contactor. The contactor is preferably designed to switch a DC voltage of more than 6 kV, preferably up to 350 A or up to 500 A. More preferably, the contactor comprises two power contacts for individually switching a first potential and a second potential of the DC voltage. Further preferably, the DC voltage is submitted from the power source to the outlet port in an isolated manner, for example by an isolated DC bus. A controlling circuit, which effects the switching of the contactor, is preferably electrically connected to the control device.

In another preferred embodiment the power source comprises a power transformer having a first side and a second side and a power converter having an AC side and a DC side, the first side of the power transformer is configured for connecting to an AC grid, the second side of the power transformer is connected to the AC side of the power converter and the DC side of the power converter is configured for providing electrical energy to charge the electrical vehicle. The power converter preferably comprises a three-phase thyristor bridge rectifier or similar means known from prior art. Preferably, the charging system comprises a single power converter providing DC power to a plurality of outlet ports. In addition, a plurality of power converters can be connected in parallel for increasing electrical charging power. The power converter may convert up to 150 kW, 300 kW or 500 kW. The electrical vehicle may include road and rail vehicles, surface and under water vessels, electric air car raft and electric spacecraft. An electrical vehicle, EV, is also referred to as an electric drive vehicle, uses one or more electric motors or transaction motors for propulsion.

In other preferred embodiment the electrical vehicle charging system comprises n outlet ports each configured for connecting the electrical vehicle to the charging system and for providing a respective DC voltage to the electrical vehicle, n switches each configured for connecting the respective outlet port and the power source, and n control devices each configured, if the electrical vehicle is unconnected to the respective outlet port, for measuring the respective DC voltage at the respective outlet port, and each configured, if the respective measured DC voltage is greater zero, for switching off the respective DC voltage, whereby n is an integer and n≥2. In such way the charging system allows for charging multiple electrical cars in parallel, each connected to a respective outlet port. It is thereby possible that all n control devices are embodied in a single control device being connected to all switches.

In another preferred embodiment the electrical vehicle charging system comprises a disconnection switch for switching off the respective DC voltage, whereby the disconnection switch is arranged between an AC grid providing the electrical energy to the power source and/or the power source and a DC bus connected to the switches, between the power source and the power transformer, between the power transformer and the power converter and/or between the power converter and the DC bus. Preferably, the control device respectively the n control devices are connected to the disconnection switch for switching off the respective DC voltage. The disconnection switch is preferably provided as an AC and/or DC electrical and/or a mechanical switch, most preferably as a contactor or the like for switching off the AC and/or DC voltage supplied to the DC bus. The control device is further configured for applying a test voltage onto the electrical connection between the power source and the outlet port, for switching off the respective DC voltage, and for measuring if thereupon the DC voltage at the outlet port decreases.

The object of the invention is further solved by a method for detecting welding in an electrical vehicle charging system, comprising a power source configured for providing electrical energy to charge an electrical vehicle, an outlet port configured for connecting the electrical vehicle to the charging system and for providing a DC voltage to the electrical vehicle, and a switch configured for connecting the outlet port and the power source, and comprising the steps: checking if the electrical vehicle is unconnected to the outlet port, if so, measuring the DC voltage at the outlet port, and if the measured DC voltage is greater zero, switching off the DC voltage.

The method provides a cheap, reliable and continuous solution for detecting welded switches, for example welded contactors, and thus significantly decreases the risk of touching parts of the electrical vehicle charging system unintentionally conducting a DC voltage, i.e. the outlet port applied with a hazarded DC voltage. The step of checking if the electrical vehicle is unconnected to the outlet port can be done by different means, for example by a detector device configured for detecting if a connector associated to the electrical car is plugged into the outlet port or not.

According to a further preferred embodiment the method comprises the steps of switching off the switch and measuring if thereupon the DC voltage at the outlet port decreases. Said embodiment provides an active outlet welding detection, in addition to a passive outlet welding detection as claimed by the respective method. Said combination of passive and active outlet welding detection significantly increases the safety of a charging system by preventing a hazarded voltage exposed on touchable parts of the charging system.

According to a further embodiment the step of measuring the DC voltage at the outlet port comprises measuring the DC voltage between a first line of the outlet port having a first potential and a second line of the outlet port having a second potential, measuring the DC voltage between the first line of the outlet port and a protective earth line of the outlet port, and/or measuring the DC voltage between the second line of the outlet port and the protective earth line of the outlet port connected to protective earth, whereby the outlet port comprises the first line, the second line and the protective earth line and the second potential is lower than the first potential.

Further embodiments and advantages of the method will be derived by the person skilled in the art in analogy to the system as described before.

BRIEF DESCRIPTION OF DRAWINGS

These and other aspects of the invention will be apparent from and elucidated with reference to the embodiments described hereinafter.

In the drawings.

DESCRIPTION OF EMBODIMENTS

Figure 1:
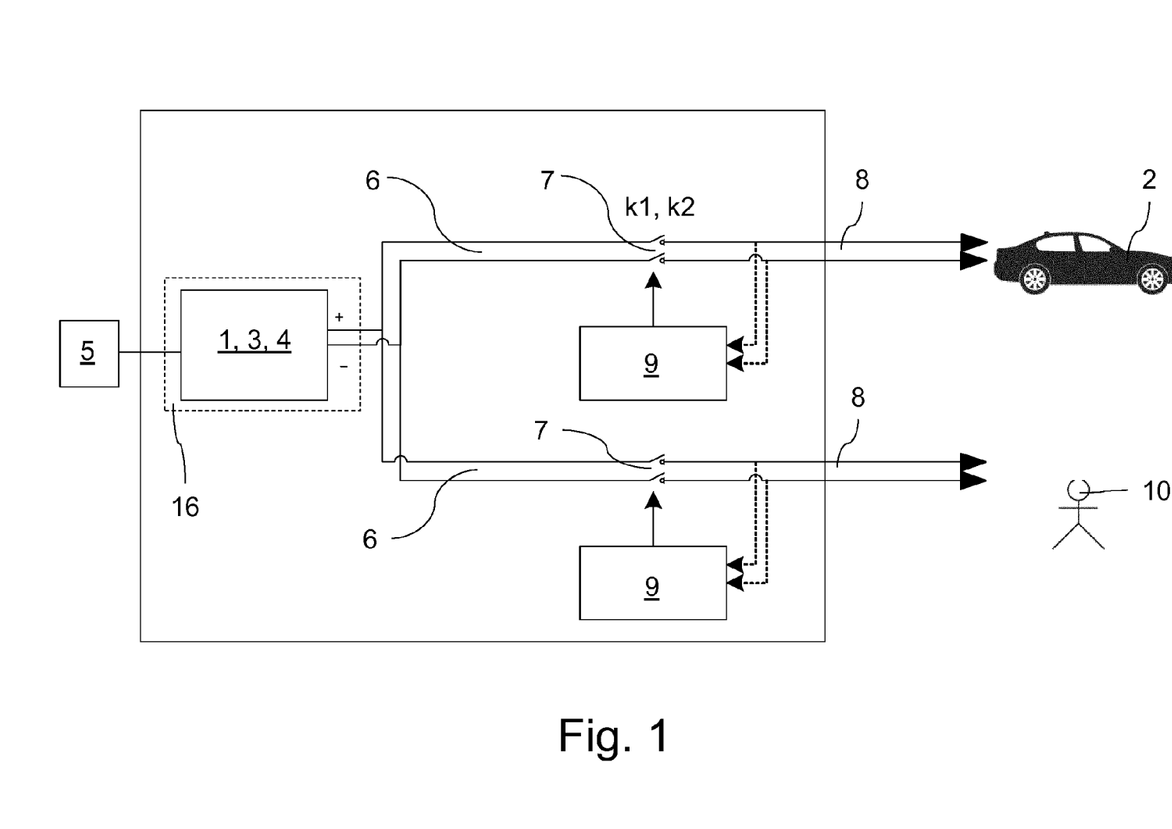
FIG. 1 shows a charging system according to a preferred embodiment of the invention in a schematic view.

FIG. 1 shows an exemplary embodiment of an electrical vehicle charging system comprising a power source 1, which is configured for providing electrical energy to charge an electrical vehicle 2. The power source 1 comprises, while not shown in detail in FIG. 1, a power transformer 3 and power converter 4. The power transformer 3 is connected with its first side to an AC grid 5. A second side of the power transformer 3 is connected to an AC side of the power converter 4, which is provided as a three-phase thyristor rectifier for converting an AC voltage provided by the AC grid 5 towards a DC voltage provided on a DC side of the power converter 4.

Said DC side is connected via an isolated DC bus 6 to a switch 7. The switch 7, if closed respectively switched on, supplies the DC voltage received from the power source 1 to an outlet port 8. As can be seen from FIG. 1, two switches 7 and respectively two outlet ports 8 are provided, which are connected in parallel to the power source 1. While not shown, the charging system may comprise additional switches 7 and outlet ports 8 also connected in parallel to the switches 7 and outlet ports 8 as shown in FIG. 1 to the power source 1.

The outlet ports 8 are provided as socket-outlets according to IEC 62196 for electrically connecting the electrical vehicle 2 via a charging cable and a respective connector, not shown, pluggable into the outlet port 8. The switches 7 are provided as contactors having two power contacts, a first one switching a first potential of the DC voltage, i.e. the positive potential and a second one switching a second potential of the DC voltage, i.e. the negative potential, referred to as K1, K2 in FIG. 1.

The electrical vehicle charging system further comprises a control device 9, which comprises a logic controller. Each an individual control device 9 is associated to each of the two switches 7. The control device 9 is configured, if the electrical vehicle 2 is unconnected to the outlet port 8, for measuring the DC voltage at the outlet port 8, elucidated with the dotted line, and configured, if the measured DC voltage is greater zero, for switching off the respective DC voltage. In FIG. 1 the upper outlet port 8 is connected by means of a connector and charging cable, not shown, to the electrical vehicle 2. The lower outlet port 8 is unconnected, i.e. no connector associated to the electrical vehicle 2 is plugged into the respective lower outlet port 8. In such case the control device 9 measures the DC voltage at the respective outlet port 8.

If the measured DC voltage is greater zero, the control device 9 switches off the DC voltage. Switching off the DC voltage can be done by switching off or shutting down the respective switch 7, by disconnecting the electrical connection between the switch 7 and the power source 1, by shutting down the power source 1 or the like. In this way it is ensured that no hazardous DC voltage is applied to touchable parts of the respective outlet port 8, for example to pins or connectors of the outlet port 8.

For switching off the DC voltage a disconnection switch 16 is provided, which is arranged between the AC grid 5 and/or the power source 1 and the DC bus connected to the switches, between the power source 1 and the power transformer 3, between the power transformer 3 and the power converter 4 and/or between the power converter 4 and the DC bus 6. As various possibilities exist for arranging the disconnection switch 16, FIG. 1 comprises a dashed line. The disconnection switch 16 can be provided as AC and/or DC switch, depending where it is actually positioned, and for example as contactor or any other means for switching respective AC and/or DC currents and voltages between the AC grid 5 and the DC bus 6.

Under normal operation conditions said pins or connectors supply the DC voltage to the electrical vehicle 2 connected to the respective outlet port 8. However, for example if the respective switch 7 is welded respectively a power contact of the switch 7 is welded, a hazardous DC voltage could still be applied to the outlet port 8, even that no electrical vehicle 2 is connected to said outlet port 8. Thus, personal safety of a human 10 unintendedly touching the outlet port 8 significantly increases, as a DC voltage, once measured by the control device 9, is switched off.

Figure 2:
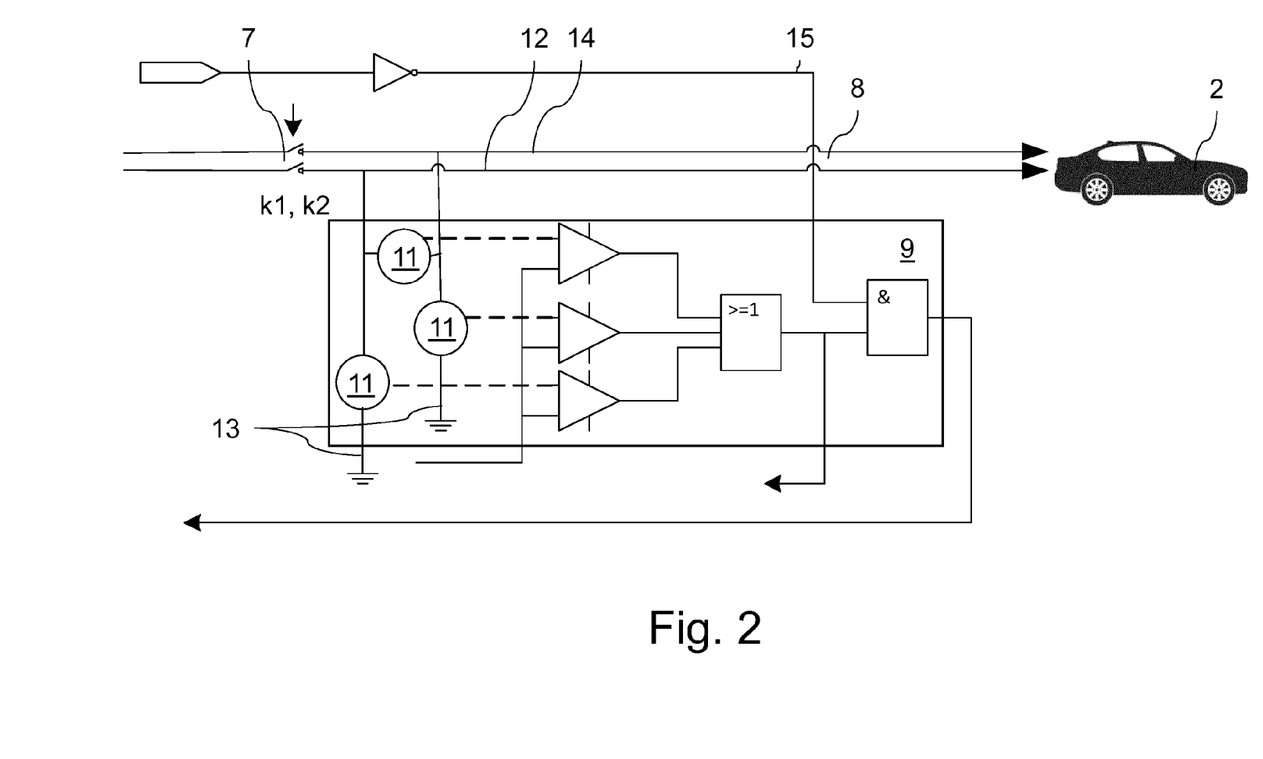
FIG. 2 shows the charging system according to FIG. 1 as a schematic circuit diagram.

FIG. 2 shows a schematic circuit diagram of the electrical vehicle charging system of FIG. 1. The control device 9 comprises three sensing resistors 11. The first sensing resistor 11 is connected between a first line 12 of the outlet port 8 and protective earth 13 for measuring the DC voltage between a first potential of the first line 12 i.e. a positive potential and protective earth. The second sensing resistor is connected between the first line 12 and a second line 13 of the outlet port 8 for measuring the DC voltage between the first potential and a second potential i.e. a negative potential associated to the second line 14. The third sensing resistor 11 measures the DC voltage between the second line 14 and protective earth 13. While not shown, the outlet port 8 comprises a protective earth line connected to protective earth 13. If any of the DC voltages method is greater zero, the control device 9 switches off the DC voltage provided to the electrical car 2 via the outlet port 8.

The control device 9 is further configured to switch off the DC voltage only after a predetermined time period of $\geq 600$ msec and $\leq 1.5$ sec has elapsed since the DC voltage greater zero has been measured. Thus, the control device 9, if a DC voltage greater than zero has measured, first waits 600 ms up to 1.5 sec before shutting down the DC voltage. In this regard, the outlet port 8 comprises a signal line 15 providing a control pilot, CP, signal to the control device 9 for submitting the predetermined time to the control device 9. Thus, the predetermined time may vary depending on the type of the electrical vehicle 2.

Figure 3:
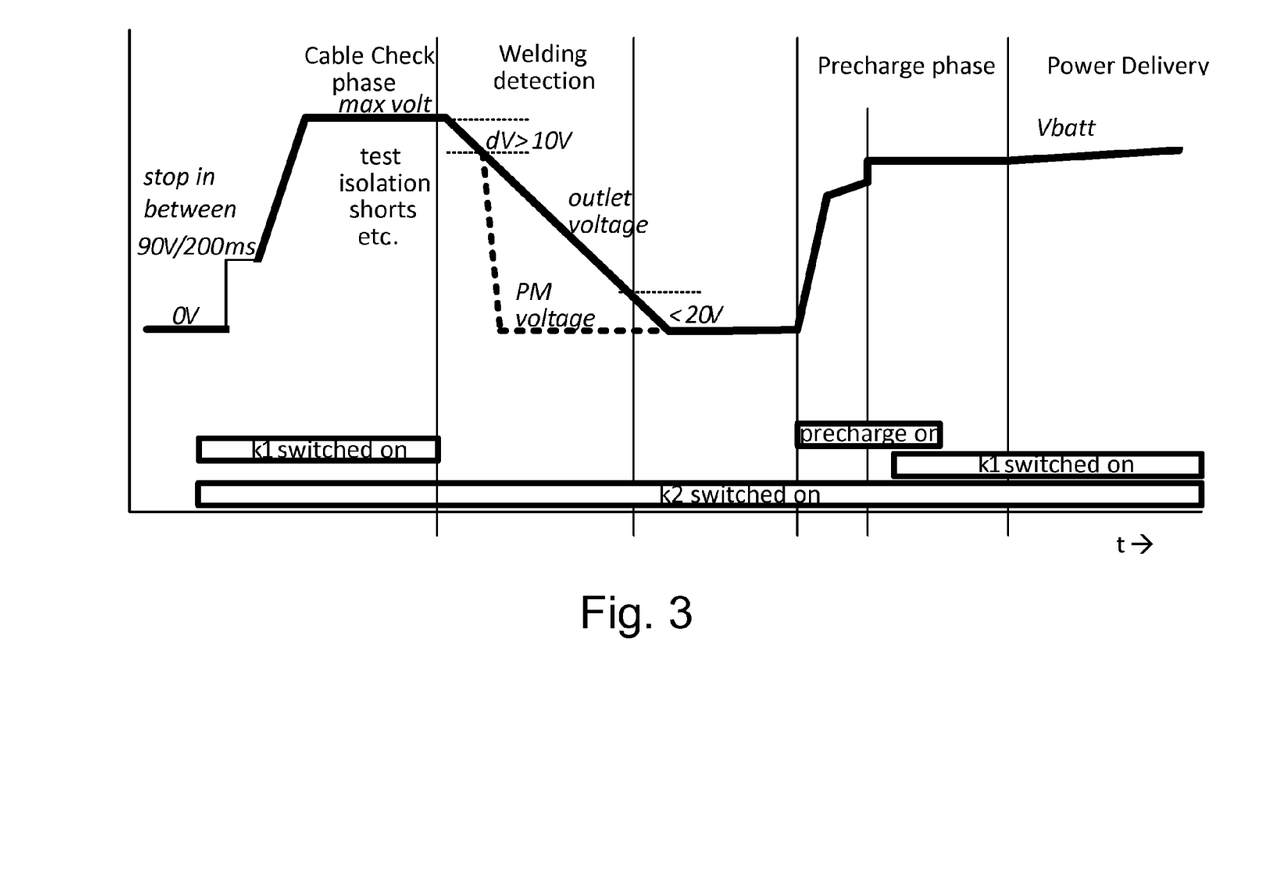
FIG. 3 shows a welding detection sequence diagram for the charging system of FIG. 1.

FIG. 3 shows a preferred charging protocol using exemplary implementation values. In a first so-called cable check phase, both switches 7 K1 and K2 are switched on and the DC charging voltage is ramped-up to a target value, but holds for a moment of 200 ms on a safe voltage level of 90 Volt before proceeding. During this time the control device 9 measures the DC voltage at the outlet port 8 and switches off the DC voltage in case a problem is encountered, such as unplugging the connector, a ground fault or an isolation fault.

After the cable check phase has been finished the DC bus 6 is discharged in the so-called welding detection phase. Instead of actively discharging the DC bus 6 the switch 7 is switched off and it is observed if the DC voltage on the outlet port 8 decreases within 500 ms by more than 10 Volt. In case the switch 7 respectively K1 is welded the DC voltage will not decrease since it is still connected through the welding to the power source 1 that still provides the DC voltage. At the end of the welding detection phase the DC bus 6 is discharged and the charging session continuous by switching on switch 7 K1 again. Once the so-called pre-charge phase has been completed DC power can be delivered to the electrical vehicle 2.

In sum, the electrical vehicle charging system provides a cheap and reliable solution for detecting welded switches 7 respectively welded contactors by using the described passive and active outlet welding detection methods, by checking if a hazardous voltage is unintendedly applied to an unused outlet port 8 and by checking if the DC voltage decreases after switching off the switch 7.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST 1 power source
2 electrical vehicle
3 power transformer
4 power converter
5 AC grid
6 DC bus 7 switch
8 outlet port
9 control device
10 human
11 sensing resistor
12 first line
13 protective earth
14 second line
15 signal line
16 disconnection switch

The invention claimed is:

1. An electrical vehicle charging system, comprising:
   a power source configured to provide electrical energy to charge an electrical vehicle,
   n outlet ports each configured to connect the electrical vehicle to the charging system and to provide a respective DC voltage to the electrical vehicle,
   n switches each configured to connect the respective outlet port and the power source, and
   n control devices each configured, if the electrical vehicle is unconnected to the respective outlet port, to measure the respective DC voltage at the respective outlet port, and each configured, if the respective measured DC voltage is greater zero, to switch off the respective DC voltage,
   wherein n is an integer and n≥2.

2. The electrical vehicle charging system according to claim 1, wherein the respective control devices are configured to measure the respective DC voltage at the respective outlet port only if the electrical vehicle is unconnected to the respective outlet port.

3. The electrical vehicle charging system according to claim 1, wherein the outlet ports comprise a first line having first potential, a second line having a second potential and a protective earth line connected to protective earth, the second potential being lower than the first potential, and the control devices are configured to measure the respective DC voltage between the first line and the protective earth, between the second line and the protective earth, and between the first line and the second line.

4. The electrical vehicle charging system according to claim 1, wherein the control devices are configured, if the respective measured DC voltage is greater zero, to disconnect the respective switch from the power source and/or to shut down the power source.

5. The electrical vehicle charging system according to claim 1, wherein the control devices are configured, if the respective measured DC voltage is greater zero, to switch off the respective DC voltage after a predetermined time period has elapsed.

6. The electrical vehicle charging system according to claim 5, wherein the predetermined time period is ≥600 msec and ≤2.5 sec.

7. The electrical vehicle charging system according to claim 5, wherein the outlet ports comprise a signal line, the control devices are connected to the respective signal line and are configured to receive the predetermined time period from the respective signal line.

8. The electrical vehicle charging system according to claim 1, wherein the control devices are configured to switch off the respective switch and are configured to measure if thereupon the respective DC voltage at the respective outlet port decreases.

9. The electrical vehicle charging system according to claim 8, wherein the control devices are configured to determine if the respective DC voltage has decreased 500 msec after switching off the respective switch by more than 10 V.

10. The electrical vehicle charging system according to claim 1, wherein the switches are provided as a contactor.

11. The electrical vehicle charging system according to claim 1, wherein the power source comprises a power transformer having a first side and a second side and a power converter having an AC side and a DC side, the first side of the power transformer is configured to connect to an AC grid, the second side of the power transformer is connected to the AC side of the power converter and the DC side of the power converter is configured to provide the electrical energy to charge the electrical vehicle.

12. The electrical vehicle charging system according to claim 11, further comprising a disconnection switch configured to switch off the respective DC voltage, wherein the disconnection switch is arranged between the AC grid to provide the electrical energy to the power source and/or the power source and a DC bus connected to the switches, between the power source and the power transformer, between the power transformer and the power converter and/or between the power converter and the DC bus.

13. A method for detecting welding in an electrical vehicle charging system, comprising:
   a power source configured to provide electrical energy to charge an electrical vehicle,
   n outlet ports each configured to connect the electrical vehicle to the charging system and to provide a respective DC voltage to the electrical vehicle, and
   n switches each configured to connect the respective outlet port and the power source,
   wherein n is an integer and n≥2, and comprising the steps:
      checking if the electrical vehicle is unconnected to the respective outlet port,
      if so, measuring the respective DC voltage at the respective outlet port, and
      if the respective measured DC voltage is greater zero, switching off the respective DC voltage.

14. The method according to claim 13, further comprising the steps:
   switching off the respective switch, and
   measuring if thereupon the respective DC voltage at the respective outlet port decreases.

15. The method according to claim 13, wherein measuring the respective DC voltage at the respective outlet port comprises:
   measuring the respective DC voltage between a first line of the respective outlet port having a first potential and a second line of the outlet port having a second potential,
   measuring the respective DC voltage between the first line of the respective outlet port and a protective earth line of the respective outlet port, and
   measuring the respective DC voltage between the second line of the respective outlet port and the protective earth line of the respective outlet port connected to protective earth,
   wherein the respective outlet port comprises the first line, the second line and the protective earth line and the second potential is lower than the first potential.

16. The electrical vehicle charging system according to claim 2,
   wherein the outlet ports comprise a first line having first potential, a second line having a second potential and a protective earth line connected to protective earth, the second potential being lower than the first potential, and the control devices are configured to measure the respective DC voltage between the first line and the protective earth, between the second line and the protective earth, and between the first line and the second line; and wherein the control devices are configured, if the respective measured DC voltage is greater zero, to disconnect the respective switch from the power source and/or for shutting down the power source.

17. The electrical vehicle charging system according to claim 16, wherein the control devices are configured, if the respective measured DC voltage is greater zero, to switch off the respective DC voltage after a predetermined time period has elapsed; and wherein the predetermined time period is ≥600 msec and ≤2.5 sec.

18. The electrical vehicle charging system according to claim 17, wherein the outlet ports comprise a signal line, the control devices are connected to the respective signal line and are configured to receive the predetermined time period from the respective signal line.

19. The electrical vehicle charging system according to claim 17, wherein the control devices are configured to switch off the respective switch and are configured to measure if thereupon the respective DC voltage at the respective outlet port decreases.

20. The electrical vehicle charging system according to claim 19, wherein the power source comprises a power transformer having a first side and a second side and a power converter having an AC side and a DC side, the first side of the power transformer is configured to connect to an AC grid, the second side of the power transformer is connected to the AC side of the power converter and the DC side of the power converter is configured to provide the electrical energy to charge the electrical vehicle.

* * * * *